US006308044B1

(12) United States Patent
Wright et al.

(10) Patent No.: US 6,308,044 B1
(45) Date of Patent: *Oct. 23, 2001

(54) SYSTEM AND METHOD OF PROVIDING OOOI TIMES OF AN AIRCRAFT

(75) Inventors: Thomas H. Wright, Indialantic; James J. Ziarno, Malabar, both of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,447

(22) Filed: Nov. 14, 2000

Related U.S. Application Data

(63) Continuation of application No. 09/312,461, filed on May 14, 1999, now Pat. No. 6,154,636.

(51) Int. Cl.$^7$ .............................. H04B 7/00; G08B 21/00
(52) U.S. Cl. ........................ 455/66; 455/67.1; 455/431; 701/14; 701/29; 701/35; 340/945; 340/539; 340/3.43; 340/825.69; 375/130; 375/219; 370/310; 370/316
(58) Field of Search ..................................... 340/945, 961, 340/971, 825.69, 825.72, 539, 3.43; 455/66, 73, 431, 67.1; 701/3, 13, 14, 29, 35; 370/227, 278, 310, 316; 375/200, 219, 220, 130

(56) References Cited

U.S. PATENT DOCUMENTS

| 4,642,775 | 2/1987 | Cline et al. ........................... 701/200 |
| 4,646,241 | 2/1987 | Ratchford et al. ..................... 701/14 |
| 4,656,585 | 4/1987 | Stephenson ............................ 701/14 |
| 4,729,102 | 3/1988 | Miller, Jr. et al. ..................... 701/14 |
| 4,788,531 | 11/1988 | Corwin et al. ........................ 340/945 |
| 4,872,182 | 10/1989 | McRae et al. ......................... 375/141 |
| 4,943,919 | 7/1990 | Aslin et al. ........................... 340/945 |
| 4,989,084 | 1/1991 | Wetzel .................................. 358/108 |
| 5,022,024 | 6/1991 | Paneth et al. ......................... 370/334 |
| 5,339,330 | 8/1994 | Mallinckrodt ........................ 370/325 |
| 5,359,446 | 10/1994 | Johnson et al. ...................... 359/152 |
| 5,459,469 | 10/1995 | Schuchman et al. ................. 342/37 |
| 5,463,656 | 10/1995 | Polivka et al. ....................... 375/200 |
| 5,469,371 | 11/1995 | Bass .................................... 701/120 |
| 5,670,961 | 9/1997 | Tomita et al. ......................... 342/36 |
| 5,809,402 | 9/1998 | Lemme ................................. 455/73 |
| 6,154,636 | * 11/2000 | Wright et al. ......................... 455/66 |

FOREIGN PATENT DOCUMENTS

| 0 407 179 A1 | 7/1990 | (EP) . |
| 2 276 006 A | 9/1994 | (GB) . |

OTHER PUBLICATIONS

Acars Data Sheet, ARINC, Sep. 30, 1998, 4 pages.

CNS Systems, Inc. Data Sheet, "*Data Communications for the Air Transport Industry*," Feb. 7, 1998, 3 pages.

Acars Data Sheet, "*OOOI Event Recording,*" ARINC, Sep. 30, 1998, 7 pages.

* cited by examiner

*Primary Examiner*—Donnie L. Crosland
(74) *Attorney, Agent, or Firm*—Allen, Dyer, Doppelt, Milbrath & Gilchrist, P.A.

(57) ABSTRACT

A method for determining the "Out," "Off,". "On," and "In" (OOOI) times for an aircraft, based on parametric data sampled in the aircraft. "Out" means out of the gate, "Off" means off the ground, "On" means on the ground, and "In" means in at the gate. Greenwich Mean Time (GMT), brake pressure, magnetic heading, ground speed, flight number and flight leg, engine start/stop, and air/ground switch are currently available parameters that can be sampled and presented to determine the OOOI times for a given flight and this data downloaded.

25 Claims, 9 Drawing Sheets

"Off" Test

"On" Test

"In" Test

SYSTEM AND METHOD OF PROVIDING OOOI TIMES OF AN AIRCRAFT

This application is a continuation of Ser. No. 09/312,461 filed on May 14, 1999, U.S. Pat. No. 6,154,636, the disclosure of which is hereby incorporated by reference in its entirety.

FIELD OF THE INVENTION

This invention relates to a system and method of providing a retrievable record of the "out," "off," "on," and "in" (OOOI) times of an aircraft, and more particularly, this invention relates to a system and method of determining OOOI times based on parametric data of the type that is routinely sampled and presented, such as in a multiplexed data stream for the flight data recorder.

BACKGROUND OF THE INVENTION

OOOI times are very important to the air transport industry for a variety of reasons. Most airlines pay their flight crews in dollars per hour based on recorded OOOI times. The FAA evaluates an air carrier's on time performance by comparing recorded OOOI times to published flight schedules. The air carrier's dispatch operations use the actual "Off" time during flight to forecast arrival times, make gate assignments, and plan ground support. A late arriving flight can necessitate a new gate assignment, which impacts ground operations from baggage handling to refueling.

Currently, some airlines require their flight crews to record OOOI times by hand on a per flight basis. The flight crew then verbally relays the "Out" and "Off" Times after departure to their ground based dispatch operations via their VHF Transceiver. Upon arrival, the flight crew hand delivers the written "On" and "In" Times to the gate agent, who subsequently enters the times at a computer terminal. The Captain's Clock in the flight deck is used as the time source. Other airlines use an Aircraft Communications Addressing and Reporting System (ACARS) Management Unit (MU) and VHF Transceiver to automatically forward OOOI times to their ground based dispatch operations. The ACARS approach has some drawbacks. Passenger and cargo doors are typically wired with sensors that detect door closure. The parking brake also has to be wired with a sensor to detect when it is released or set. These discrete wires have to be installed and routed to the ACARS MU, along with the landing gear squat switch discrete, to provide it the information it requires to define the OOOI times. The cost of using the ARINC provided ACARS service to forward OOOI times is expensive by commercial wireless telecommunication standards. The cost associated with ACARS is what motivates some airlines to favor the manual approach.

The "Out" time is defined as the moment in time when the aircraft pushes back from the gate. ACARS defines this as the moment when all passenger and cargo doors are closed and the parking brake is released. Brake pressure drops from greater than 3,000 psi to less than 100 psi. Prior to pushback, power to the aircraft transitions from ground power to internally provided Auxiliary Power Unit (APU) power. Power from the APU is required to start the first engine. If the APU is working, the engines are started after pushback. A "tug" is typically used to push the aircraft backwards, away from the Jetway. In some situations, aircraft push back under engine power. The tug turns the aircraft so that once the engines are started, the aircraft is pointing in a direction where it can proceed forward under engine power. This event is marked by a change in magnetic heading from the constant heading while at the gate. If the APU isn't working, then the number one or left engine is started at the gate, before disconnecting from ground power. The right engine, on the same side as the cargo doors, usually remains off until after pushback, to accommodate any last minute baggage loading requirements.

Many airlines do not keep their parking brakes engaged the entire time the aircraft is parked at the gate. Because the brakes get very hot during landing and taxi in, they are prone to binding or warping as they cool down if left engaged for long periods of time. Therefore many carriers choose to set the parking brake once "In" at the gate only long enough to allow the ground crew to position the chocks on either side of the wheel(s) to prevent the aircraft from moving. Once the chocks are secured, the parking brake is released. The parking brake is set again as part of the flight deck preparation process, prior to pushback. The parking brake is engaged before the chocks are removed. Once removed, the parking brake remains engaged until pushback. The release of parking brake and associated change in brake pressure defines the "Out" time. Engaging the parking brake at the gate and the associated change in brake pressure defines the "In" time. Other parameters are used to segregate the "Out" and "In" events from routine braking during taxi operations.

Once the engines start, the aircraft proceeds with the taxi operation until the aircraft receives Air Traffic Control clearance to take off. The Air/Ground Relay is monitored to detect the precise moment when the aircraft wheels leave the runway. This time is recorded as the "Off" Time, i.e., weight off wheels. When the aircraft reaches its destination, the time when the aircraft wheels come into contact with the runway is recorded as the "On" Time, i.e., weight on wheels. The aircraft then taxis to its assigned gate. The moment that the parking brake is set is recorded as the "In" Time.

It would be desirable to eliminate the need for flight crews to manually record OOOI times. Because many of these times are recorded during high workload phases of flight, removing this requirement from flight crews improves flight safety. The main benefit of this method is improved accuracy and reduced operating costs. The current process is subject to human error and "gaming", particularly if the flight crew's pay check directly benefits if the flight duration is artificially inflated. Conversely, an air carrier might avoid a penalty for poor on time performance by artificially shortening flight duration. Although the people involved in the process possess high levels of personal integrity, it is nevertheless advantageous to eliminate the temptation with in automated system. From an operating cost perspective, a significant amount of labor is eliminated with an automated process. Currently the flight crew phones the recorded "Out" and "Off" times back to dispatch after takeoff and hands the recorded "On" and "In" times to the gate agent once back on the ground. The gate agent then forwards this information to a data entry person, where it is hand input into a payroll database where it affects payroll actions and an on time performance analysis database.

Harris Corporation of Melbourne, Fla. manufactures a product referred to as Ground Data Link (GDL), which provides a wireless system of transferring data files to and from air transport aircraft while on the ground at GDL equipped airports. The basics of the system are disclosed in a co-pending patent application entitled, "Wireless, Frequency-Agile Spread Spectrum Ground Link-Based Aircraft Data Communication System", filed Nov. 14, 1995, U.S. Ser. No. 08/557,269, the disclosure which is hereby incorporated by reference in its entirety. (U.S. Pat. No. 6,047,165, issued Apr. 4, 2000).

Miller, Jr. et al describe a system for similarly recording and processing telemetry data. In the Miller art, recorded information is periodically retrieved manually via a Ground Readout Unit, which connects to their Airborne Integrated Data System via a conventional wired data port. Miller also provides for an interface to an Aircraft Communications Addressing and Reporting System (ACARS), which is a low data rate (2.4 kbps), high usage cost, air to ground transceiver used, from a practical standpoint, to send high priority "snapshots" of recorded to data to ground stations while airborne. In Miller, parametric data is gathered to assist in both aircraft maintenance and to monitor aircraft and crew performance, but does not use OOOI times, or any means of deriving them from parametric data.

SUMMARY OF THE INVENTION

It is therefore an object of the present invention to determine OOOI times based on parametric data of the type that is routinely sampled and presented, such as in a multiplexed data stream to the flight data recorder.

The present invention provides a system and method for determining the OOOI times based on parametric data routinely sampled and presented in a multiplexed data stream to the Flight Data Recorder. The system and method can also be used to forward automatically the OOOI times in support of payroll and on time performance analysis applications after the aircraft lands. It is also used to forward automatically the "Out" and "Off" times immediately after take-off in support of dispatch planning and scheduling applications. In a preferred embodiment of the invention, "Out" and "off" times are determined through analysis of these parameters immediately after takeoff and downloaded over a RF Link to a ground station. These parameters, as well as the "On" and "In" times, can also be recorded and forwarded at the end of the flight to an analysis station where the OOOI times are subsequently computed on a remote platform.

In accordance with the present invention, a system and method provides a retrievable record of the "out," "off," "on," and "in" (OOOI) times of an aircraft. A plurality of sensors acquire data relating to the OOOI times of an aircraft. These plurality of sensors are located throughout the aircraft and sense routine aircraft conditions and generate parametric data, such as received by a flight data recorder. A multiplexer is connected to the plurality of sensors and receives the parametric data from the plurality of sensors and multiplexes the data. A central processing unit is positioned within the aircraft and operatively connected to the multiplexer. It receives a sample of the multiplexed stream of parametric data and demultiplexes the data and calculates the OOOI times of the aircraft. A data store is positioned within the aircraft and connected to the central processing unit for storing the calculated OOOI times of the aircraft. A transmitter is coupled to the data store and is operative to download data relating to the OOOI times of the aircraft over a radio frequency communication signal. An airport based receiver receives the radio frequency communication signal from the aircraft. An airport based processor is connected to the airport based receiver and receives the data relating to the OOOI times of the aircraft for further processing the data.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
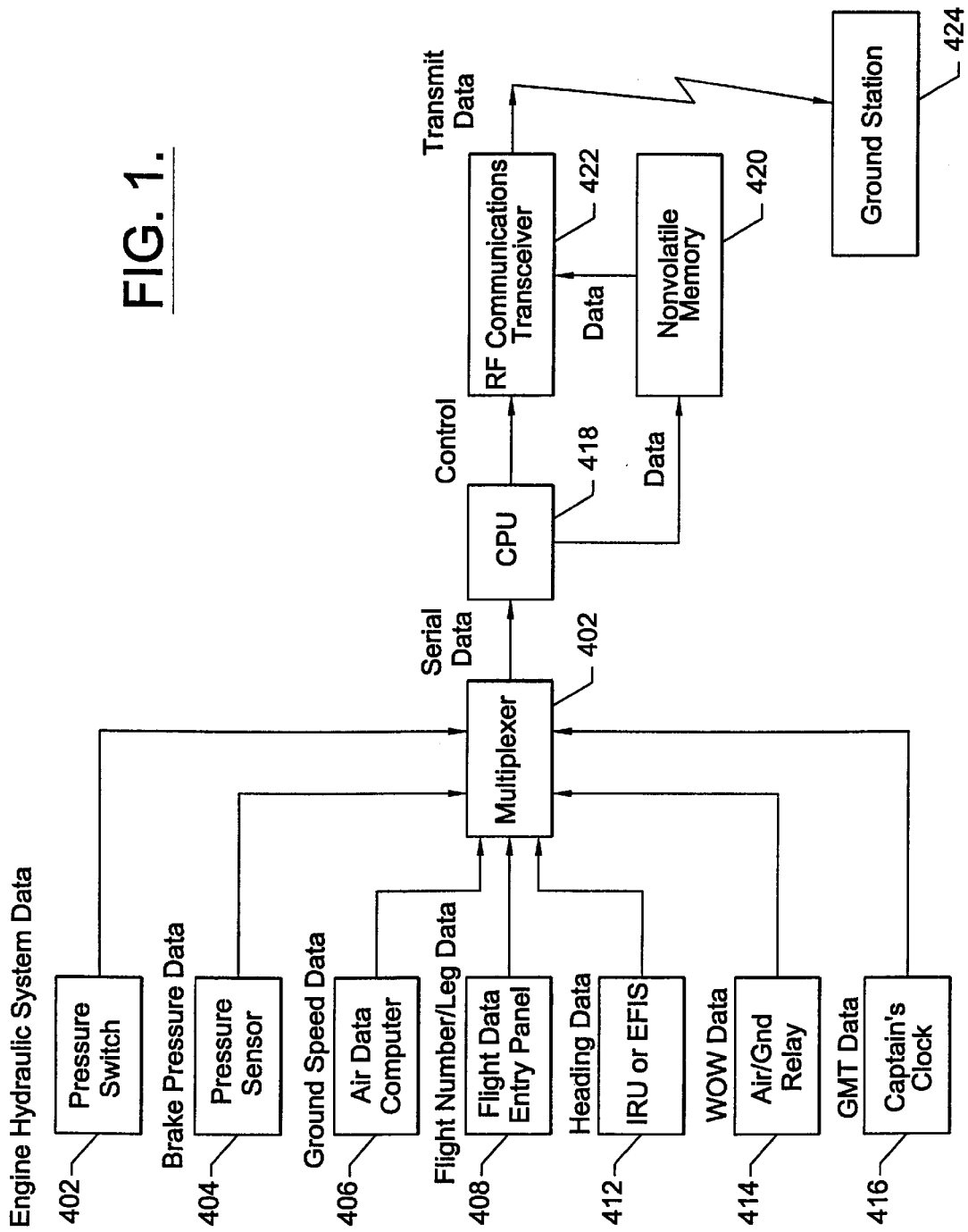
FIG. 1 is a block diagram of the basic system used for determining OOOI times in an aircraft.
Figure 2:
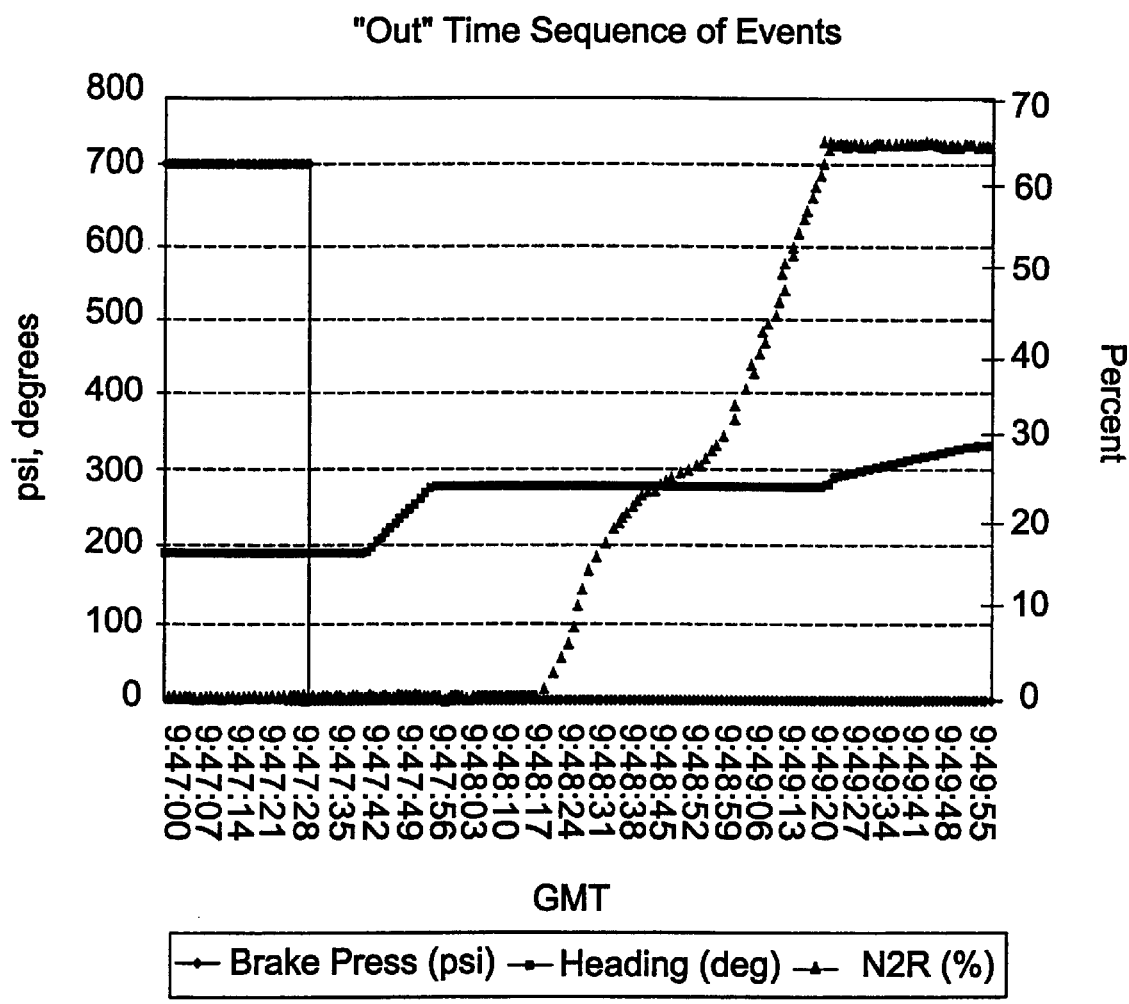
FIG. 2 is a graph showing the "out" time sequence of events.

FIGS. 1 and 2 illustrate a basic block design of the system and a sequence of events that can be used to determine the "Out" and "Off" Times. After the passenger and cargo doors are closed, the release of the parking brake defines the "Out" time. Unfortunately, parametric data that directly corresponds to the closing of doors and the parking brake itself are not readily available. A reading of the pressure in the hydraulic brake system is available. When the parking brake is released, the brake pressure drops from approximately 3,000 psi to approximately 0 psi. Other parametric data must therefore be used to distinguish the release of parking brake from routine setting of the parking brake during taxi operations.

Since aircraft are designed with an emphasis on safety, they provide many redundant systems that can take over the operation of a primary system, in the event it fails. As a result, there is redundant information available that can be utilized to improve the confidence of the OOOI times that are derived. The present invention takes advantage of the availability of multiple data sources by sampling redundant parameters. When both parameters agree, the OOOI time can be derived with great confidence. When two parameters do not agree, the OOOI time can still be calculated but is accompanied with a status flag indicating that the information sampled is inconsistent and therefore the time could be erroneous.

Figure 3:
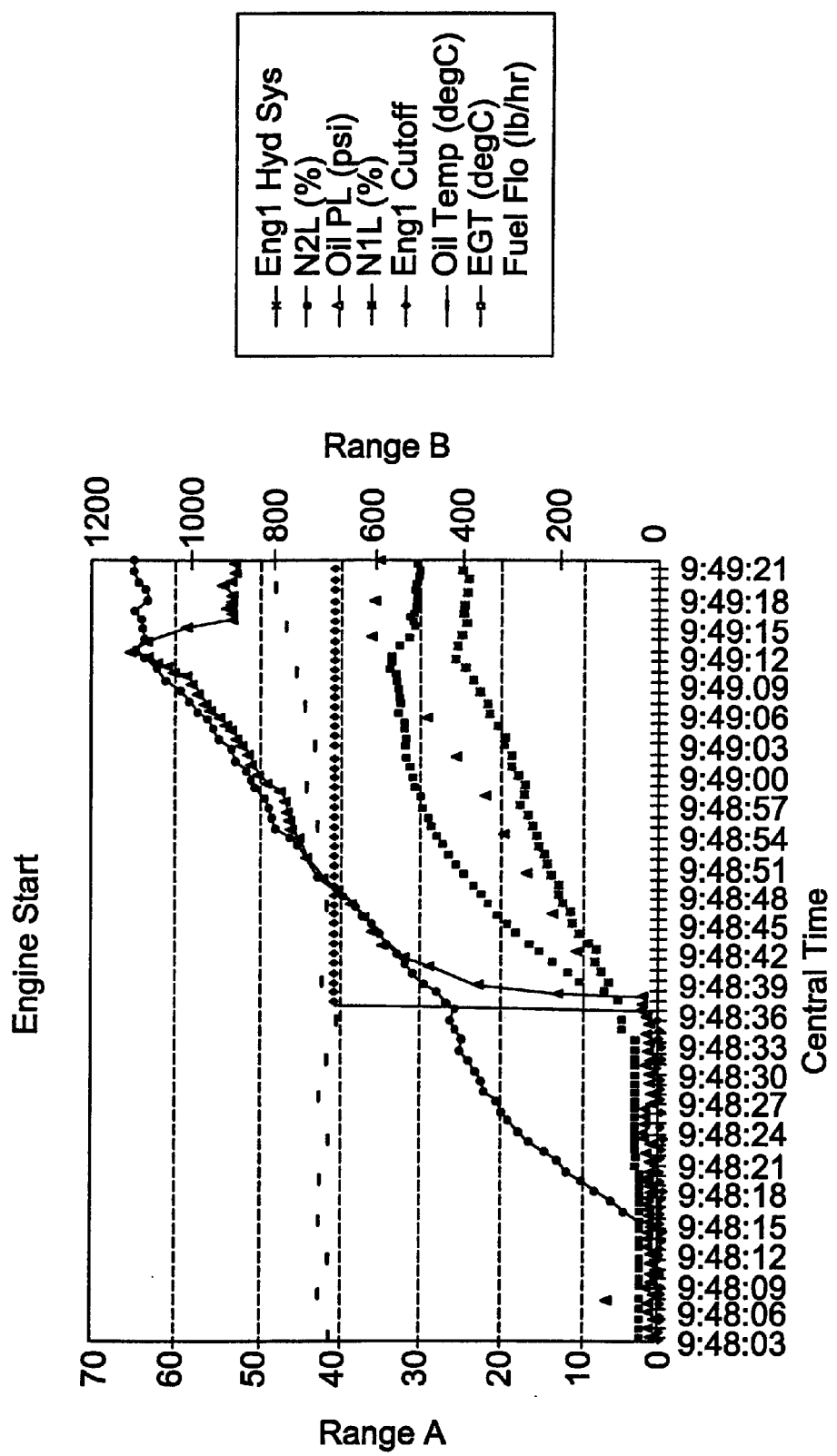
FIG. 3 is a graph showing engine start parameters.

There are two methods, for example, to determine that an engine has started. The first method is to monitor the hydraulic system switch that is associated with each engine. On a two engine aircraft, each engine is used to provide hydraulic pressure for one or more hydraulic systems. A discrete switch is associated with each hydraulic system that changes state when the pressure in the hydraulic system goes from "low" to "normal". When an engine is started, its spinning turbine pressurizes the hydraulic system and its associated discrete changes logical state. An engine start condition can therefore be determined by reading its associated hydraulic system discrete, as shown in FIG. 3.

Another method used to determine engine start is to monitor N2, which is expressed as a percentage and corresponds to the actual RPM of the engine divided by the engine's maximum rated RPM. When the engine is off, the value of N2 is approximately zero. N2>10% can also be used to determine engine start, as shown in FIG. 3. In the event the pressure switch associated with the hydraulic pressure sensor fails, engine start can still be determined by reading N2.

Table 1 lists each parameter used in this method for determining OOOI times and each of its redundant information sources:

TABLE 1

Redundant Information Sources For Each Parameter

| Parameter | Information Source | Information Source |
| --- | --- | --- |
| Time | Captain's Clock | UTC Time Source |
| Engine Start | Hydraulic Sys A/B | N2 Left/Right |
| Movement | Magnetic Heading | Ground Speed |
| Weight on Wheels | Left or Right Main Gear | Nose Gear |
| Parking Brake | Brake Pressure Left | Brake Pressure Right |
| Flight Number/Leg and/or Departure and Arrival Station | Flight Data Entry Panel | Flight Management Computer |

This description will continue without references to sampling redundant information sources, which will be omitted for algorithmic simplicity. In a preferred embodiment however, as will be explained below, redundancy is used to improve confidence in the derived OOOI times.

As noted above, there are situations where the parking brake can be released while still parked at the gate and then reapplied. The last release of brake pressure can be discerned by subsequently looking for a change in heading of greater than two (2) degrees per sample. Heading is typically sampled every second. After the tug has pushed the aircraft back away from the gate, it turns the aircraft to point in a direction where it can taxi forward. When the tug turns the aircraft, a change in heading of greater than 2 degrees per second occurs. To make sure the aircraft has not returned to the gate for some anomalous reason, the engines are monitored following the heading change to make sure the taxi operation has begun. If the heading returns to the original value before the engines start, then the aircraft has returned to the gate and the entire process starts over. If the engines start without the heading value returning to the original value, then the last release of brake pressure followed by a heading change is recorded as the "Out" time.

Once the aircraft pushes back from the gate and turns, the engines are started and the taxi operation begins. The aircraft taxis to a position at the end of the runway and waits for clearance onto the active runway. Once clearance is granted, the aircraft taxis into position and holds at the "hold line". Once takeoff clearance is received, the aircraft increases speed until it becomes airborne. The "Off" time is defined by the moment the aircraft's weight is off the landing gear. An Air/Ground squat switch is mounted to the landing gear and used to detect the weight off wheels and the weight on wheels. ARINC defines the "Off" time as the moment when the landing gear switch first annunciates the extension of the strut followed by 10 seconds of continuous strut extension.

The reverse is true during landing. The "On" time is defined by the moment the aircraft's weight is on the landing gear or wheels. The "On" time is declared only after 10 continuous seconds of strut compression. A ground speed of less than 30 knots is used to differentiate between a legitimate landing and a "touch and go" or "go around". The aircraft then taxis to its assigned gate. Once the aircraft arrives at the gate, the parking brake is set, which defines the "In" time. The engines are shut down, the chocks are used to secure the wheels, and the doors are opened. If the engines are shut down while the parking brake is set, then flight number and flight leg are monitored to verify that the aircraft is at the gate and preparations are underway to ready the aircraft for the next flight. The engines are continuously monitored along with flight number and flight leg to make sure that the engines are not restarted before the flight number and flight leg are changed. If the flight number/leg changes without the engines restarting, then the last time the parking brake was set followed by a change in flight number/leg is recorded as the "In" time.

Although most carriers enter flight number and flight leg prior to every departure, at least one major carrier surveyed does not. Changes in departure and arrival station can alternatively be used to distinguish transitions between "in" and "out" times in situations where flight number and flight leg is not used, as shown in Table 1.

Figure 4:
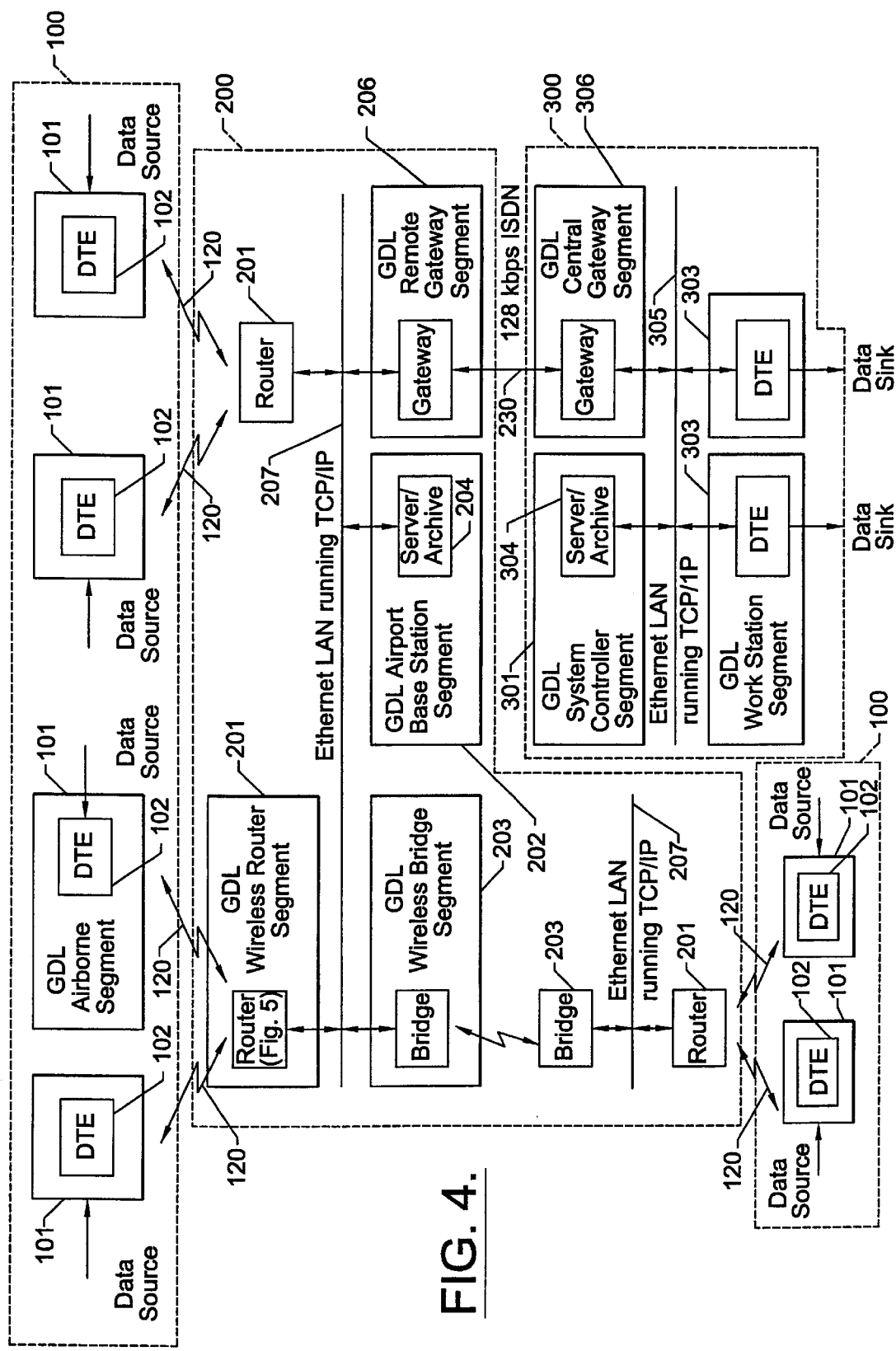
FIG. 4 is a block diagram showing the basic elements of a ground data link unit that in one embodiment is used with the OOOI determination.

Referring now to FIG. 4, there is shown an overall system architecture of a wireless ground link-based aircraft data communication system that could be used to determine and downlink OOOI times. The architecture is shown as being comprised of three interlinked subsystems: (1) an aircraft-installed ground data link (GDL) subsystem 100; (2) an airport-resident ground subsystem 200; and (3) a remote airline operations control center 300. The aircraft-installed ground data link (GDL) subsystem 100 is comprised of a plurality of GDL airborne segments 101 each of which is installed in the controlled environment of the avionics compartment of a respectively different aircraft. Each GDL airborne segment 101 is operative to communicate with a wireless router (WR) segment 201 of the airport-resident ground subsystem 200 through a wireless communications link 120.

The wireless router segment 201 routes the files it receives from the GDL airborne segment 101, either directly to the airport base station 202 via the wired Ethernet LAN 207, or indirectly through local area networks 207 and airport-resident wireless bridge segments 203. The wireless communication link 120 can be a spread spectrum radio frequency (RF) link having a carrier frequency lying in an unlicensed portion of the electromagnetic spectrum, such as within the 2.4–2.5 GHz S-band.

As will be described, once installed in an aircraft, the data terminal equipment (DTE) 102 of a GDL segment 101 collects and stores flight performance data generated on board the aircraft during flight. It also stores and distributes information uploaded to the aircraft via a ground subsystem's wireless router 201, which is coupled thereto by way of a local area network 207 from a base station segment 202 of a ground subsystem 200 in preparation for the next flight or series of flights.

The uploaded information, which may include any of audio, video and data, typically contains next flight information data, such as a flight plan, dispatch release, or load manifest, and uploadable software including, but not limited to, a navigation database associated with the flight management computer, as well as digitized video and audio files that may be employed as part of a passenger service/entertainment package.

The ground subsystem 200 includes a plurality of airport-resident GDL wireless router segments 201, one or more of which are distributed within the environments of the various airports served by the system. A respective airport wireless router 201 is operative to receive and forward flight performance data that is wirelessly down linked from an aircraft's GDL unit 101 and to supply information to the aircraft in preparation for its next flight, once the aircraft has landed and is in communication with the wireless router. Each ground subsystem wireless router 201 forwards flight files from the aircraft's GDL unit and forwards the files to a server/archive computer terminal 204 of the aircraft base station 202, which resides on the local area network 207 of the ground subsystem 200.

The airport base station 202 is coupled via a local communications path 207, to which a remote gateway (RG) segment 206 is interfaced over a communications path 230, to a central gateway (CG) segment 306 of a remote airline operations control center 300, where aircraft data files from various aircraft are analyzed. As a non-limiting example communications path 230 may comprise an ISDN telephone company (Telco) land line, and the gateway segments may comprise standard LAN interfaces. However, it should be observed that other communication media, such as a satellite links, for example, may be employed for ground subsystem-to-control center communications without departing from the scope of the invention.

The flight operations control center 300 includes a system controller (SC) segment 301 and a plurality of GDL workstations (WS) 303, which are interlinked to the systems controller 301 via a local area network 305, so as to allow flight operations and flight safety analysts at control center 300 to evaluate the aircraft data files conveyed to the airline operations control center 300 from the airport base station segments 202 of the ground subsystem 200.

The respective GDL workstations 303 may be allocated for different purposes, such as flight operations, flight safety , engineering/maintenance or passenger services. As described briefly above, the server/archive terminal 204 in the base station segment 202 is operative to automatically forward OOOI reports downloaded from an aircraft to the flight control center 300; it also automatically forwards raw flight data files.

The system controller 301 has a server/archive terminal unit 304 that preferably includes database management software for providing for efficient transfer and analysis of data files, as it retrieves downloaded files from a ground subsystem. As a non-limiting example, such database management software may delete existing files from a base station segment's memory once the files have been retrieved.

Figure 5:
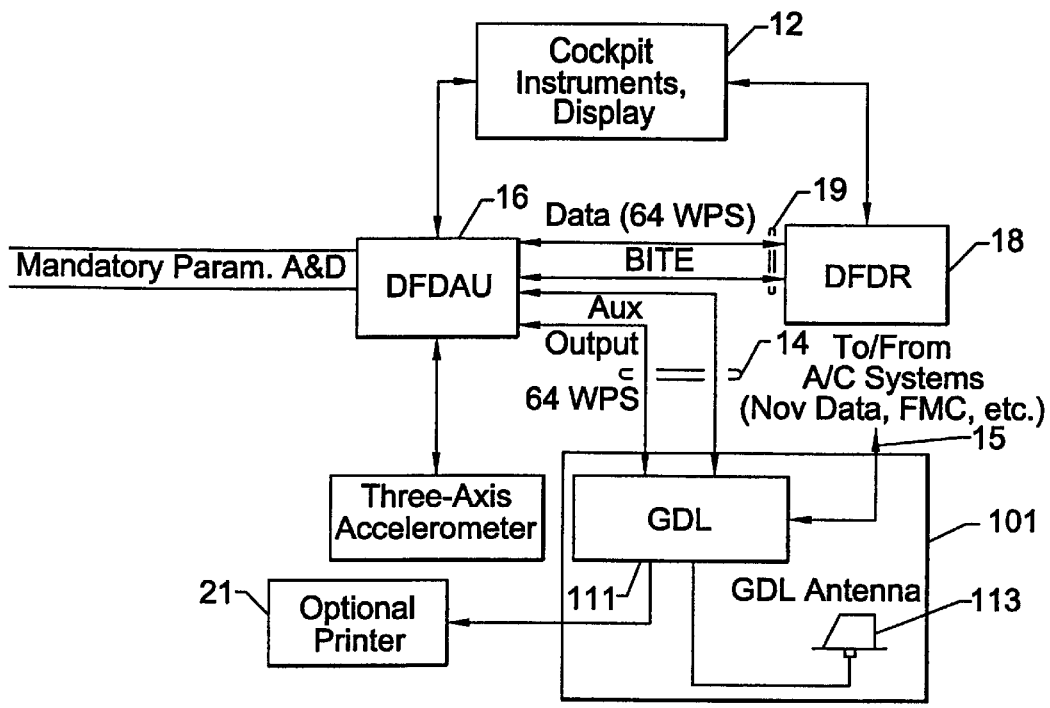
FIG. 5 is another block diagram of another part of the ground data link unit showing various components.

Referring now to FIG. 5, a respective GDL segment 101 is diagrammatically illustrated as comprising a GDL data storage and communications unit 111 (hereinafter referred to simply as a GDL unit, to be described with reference to FIG. 6) and an associated external airframe (e.g., fuselage) mounted antenna unit 113. In an alternative embodiment, antenna unit 113 may house diversely configured components, such as spaced apart antenna dipole elements, or multiple, differentially (orthogonally) polarized antenna components.

The GDL unit 111 is preferably installed within the controlled environment of an aircraft's avionics compartment, to which communication links from various aircraft flight parameter transducers, and cockpit instruments and display components, shown within broken lines 12, are coupled. When so installed, the GDL unit 111 is linked via an auxiliary data path 14 to the aircraft's airborne data acquisition equipment 16 (e.g., a DFDAU, in the present example). The GDL unit 111 synchronizes with the flight parameter data stream from the DFDAU 16, and stores the collected data in memory. It is also coupled via a data path 15 to supply to one or more additional aircraft units, such as navigational equipment and/or passenger entertainment stations, various data, audio and video files that have been uploaded from an airport ground subsystem wireless router 201.

The airborne data acquisition unit 16 is coupled to the aircraft's digital flight data recorder (DFDR) 18 by way of a standard flight data link 19 through which collected flight data is coupled to the flight data recorder in a conventional manner.

Figure 6:
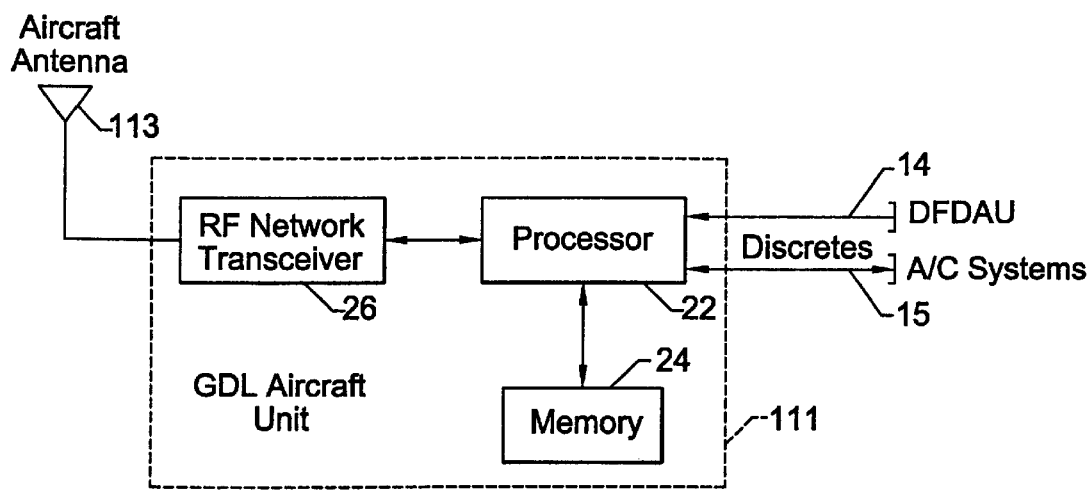
FIG. 6 is a block diagram illustrating basic components of the ground data link aircraft unit.

As described briefly above, and as diagrammatically illustrated in FIG. 6, the GDL unit 111 can be a bidirectional wireless (radio frequency carrier-based) subsystem containing a processing unit 22 and associated memory 24 coupled to the DFDAU 16, via data path 14, which is parallel to or redundant with the data path to the flight data recorder 18. Processing unit 22 receives and compresses the same flight performance data that is collected by the aircraft's digital flight data recorder, and stores the compressed data in associated memory 24. An OOOI report is generated by the processing unit 22, that includes the flight number/leg and tail number/tray number of the aircraft and the appropriate OOOI time.

To provide bidirectional RF communication capability with a wireless router 201, the GDL unit 111 includes a wireless (RF) transceiver 26, which is coupled to the antenna unit 113.

As will be described, on each of a plurality of sub-band channels of the unlicensed 2.4–2.5 GHz S-band segment of interest, a wireless router 201 could continuously broadcast an interrogation beacon that contains information representative of the emitted power level restrictions of the airport. Using an adaptive power unit within its transceiver, the GDL unit 111 on board the aircraft could respond to this beacon signal by adjusting its emitted power to a level that will not exceed communication limitations imposed by the jurisdiction governing the airport. The wireless (RF) transceiver 26 then accesses the OOOI report data file stored in memory 24, encrypts the data and transmits the file via a selected sub-channel of the wireless ground communication link 120 to wireless router 201.

The recipient wireless router 201 forwards the OOOI report data file to the base station segment temporarily until the OOOI report file can be automatically transmitted over the communications path 230 to the remote airline operations control center 300 for analysis. Further details of the associated components are described in the '269 application.

Referring now to FIG. 1, there is illustrated a system 400 for OOOI determination. The system 400 can be used with the GDL unit as described as a separate system apart from the GDL. It is anticipated that the system 400 will be incorporated into the GDL system as described above.

Multiplexer 402 receives telemetry data from a variety of aircraft sensors. Pressure Switch 402 provides an indication of engine start. Pressure Sensor 404 provides a reading that corresponds to the hydraulic pressure in the brake system ranging from –165 to 3300 in pounds per square inch (psi). Air Data Computer 406 provides ground speed in knots. Flight Data Entry Panel 408 provides the current flight's flight number and flight leg. If the airline takes the aircraft offline for maintenance, the Flight Data Entry Panel provides a unique flight number and flight leg that indicates the aircraft is in maintenance mode. The Inertial Reference Unit (IRU) and/or Electronic Flight Instrument System (EFIS) 412 provides a measurement of heading ranging from 0 to 360 in degrees. The Air/Ground Relay 414 provides a 1 or a 0, corresponding to weight off wheels or weight on wheels, respectively. The Captain's Clock 416 provides a measure of time referenced to Greenwich Mean Time (GMT), or Universal Coordinated Time (UTC), as it is more recently referred to.

The multiplexer 402 presents a multiplexed data stream to CPU 418 with samples of the above mentioned parametric data at a typical rate of once per second. The multiplexer 402 can be programmed to support different sample rates. In one embodiment, the CPU 418 stores the multiplexed data stream as a flight file in Nonvolatile Memory 420. When the aircraft lands, the CPU 418 presents the archived flight file to RF Communications Transceiver 422 and commands the transceiver to transmit the flight file to a fixed ground station. When the file arrives at the fixed ground station, it is forwarded over conventional telecommunication circuits to a central file server and archived in a database of like files.

In a second and preferred embodiment, the CPU 418 demultiplexes the arriving multiplexed data stream to recover the parametric data presented by sensors 402–416. The CPU 418 processes the parametric data by executing the algorithms described herein to compute the "Out", "Off", "On", and "In" times for each given flight. The CPU 418 temporarily stores the OOOI times in the Nonvolatile Memory 420. The CPU 418 presents the computed OOOI times to the RF Communications Transceiver 422 and commands the transceiver to transmit the OOOI times to a fixed ground station 424. "Out" and "Off" times are sent immediately after takeoff, "On" time is sent immediately after landing, and "In" time is sent after the new flight number/leg is entered during the flight checklist process for the next flight.

Figure 7:
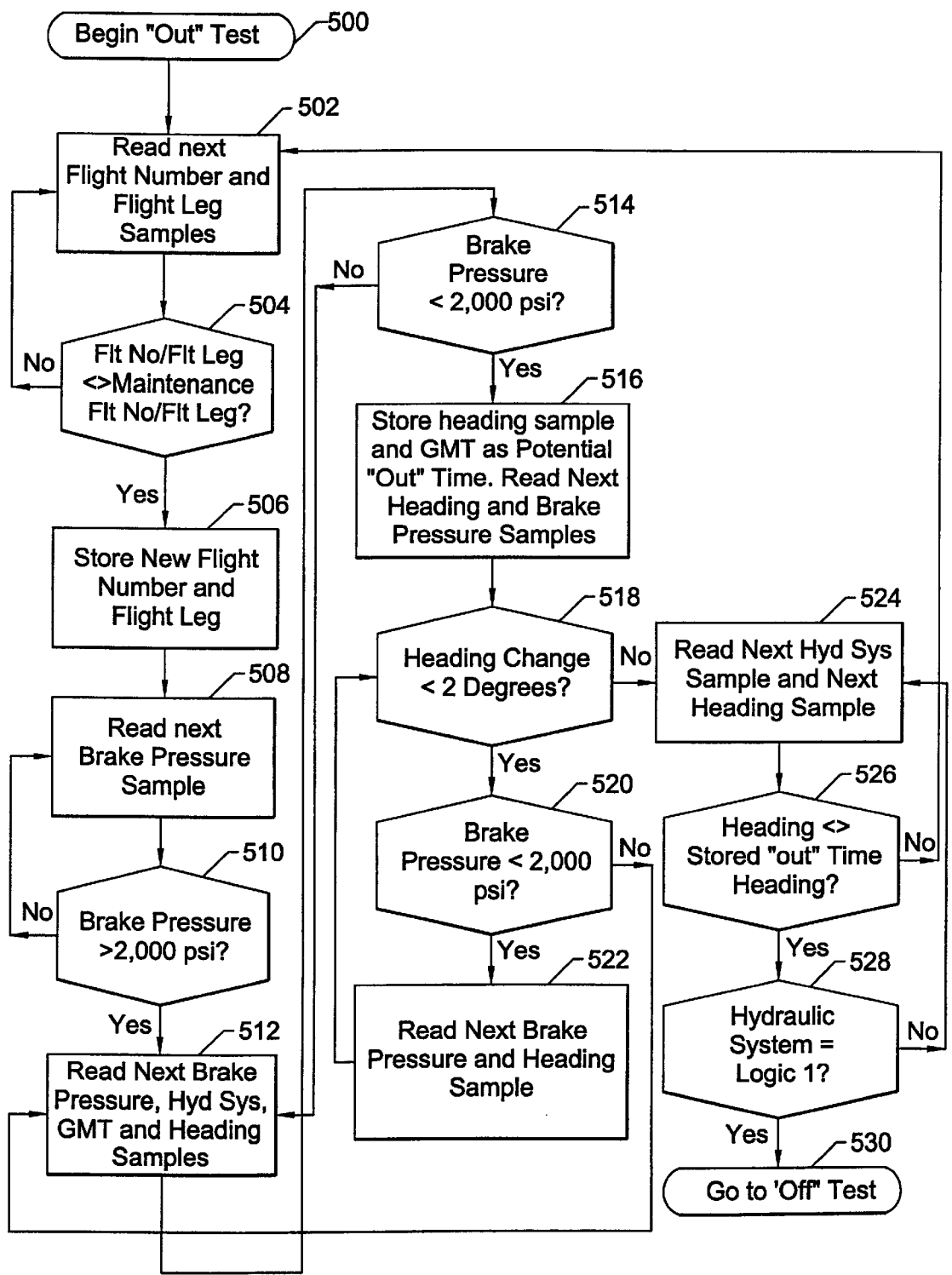
FIG. 7 is a flow chart illustrating the "out" test.

The flow chart for the "Out" Test is shown in FIG. 7. For purposes of this flow chart and subsequent flow charts, it will begin with reference numerals beginning in the 500 series. The "Out" Test is entered upon completion of the "In" Test or whenever the unit is powered on (block 500). The next flight number and flight leg sample is read (block 502). These samples are compared (block 504) predetermined coded value(s) stored in memory to determine if the flight number and flight leg, or alternatively, departure and arrival station are representative of a non-passenger maintenance trip, e.g., taxiing from the gate to a maintenance hangar at the same airport. If they are, then the flight number and flight leg, or alternatively, departure and arrival station continue to be sampled until they reflect a non-maintenance flight number and flight leg.

The preferred embodiment of this invention is to rely on the transition in flight number and/or flight leg, or alternatively, departure and arrival station to differentiate between real "In" and "Out" events and other common events such as holds or maintenance actions that might otherwise be confused with "In" and "Out" events. If an airline is unwilling to consistently provide this information by requiring their flight crews to enter it between flights, then a second embodiment of this invention is to physically connect passenger and cargo door closure sensors as discrete inputs to this system. Door open and door closure information can be substituted for changes in flight number/flight leg as a means of pinpointing the "In" and "Out" events.

The new non-maintenance flight number and flight leg are stored in non-volatile memory (block 506). The next brake pressure sample is read (block 508). The brake pressure is compared against a value of 2,000 psi (block 510) to determine if the parking brake is set. If the brake pressure is less than 2,000 psi, then the parking brake is off and brake pressure continues to be sampled until the brake pressure exceeds 2,000 psi. When brake pressure exceeds 2,000 psi, then the parking brake is declared set.

The next brake pressure, GMT, and heading samples are read, along with the hydraulic system discrete (block 512). The brake pressure is compared against a value of 2,000 psi (block 514) to determine if the parking brake has been released. If the brake pressure is greater than 2,000 psi, then the parking brake is still set and brake pressure continues to be sampled until the brake pressure drops below 2,000 psi. When brake pressure drops below 2,000 psi, then the parking brake is declared released. At this point, the last GMT sample is stored as the potential "Out" time (block 516).

The last heading sample is also stored and the next heading and brake pressure samples are read. The new heading sample is compared against the stored heading sample (block 518) to determine if the new sample has changed by more than two (2) degrees. A heading change of greater than two (2) degrees per second is representative of a push back event and is therefore used to validate the potential "Out" time. If the heading change is less than two (2) degrees, then brake pressure is monitored (block 520) to determine if the parking brake is still released or has been reset. If the parking brake has been reset, then the process returns to the previous step of block 512 to look for a new potential "Out" time. This path is necessary since the parking brake can be set and reset an undefined number of times while the aircraft is parked at the gate.

If the step of Block 520 indicates that the parking brake is still released, then brake pressure and heading continue to be sampled (block 522) looking for a heading change (block 518) greater than two (2) degrees/second. When the heading changes by more than two (2) degrees, the next hydraulic system discrete and heading samples are read in the step shown by block 524. The engine hydraulic system discrete transitions from a logic 0 (low pressure) to a logic 1 (normal) when an engine starts.

The step shown in block 526 continues monitoring heading to determine if the aircraft has returned to the gate, e.g., if the engines can't be started from the APU and a connection to ground power is required to start the engine(s). If the aircraft does return to the gate, then the process returns to the beginning of the "Out" test. The "Out" tests starts over from the beginning because the reason for returning to the gate may be associated with the flight crew's determination that the aircraft is not safe for flight and requires maintenance. In this event, the passengers would deplane and the flight number and flight leg would be changed to reflect the appropriate maintenance action. If the return is temporary and the passengers do not deplane, then the flight number and flight leg will remain the same and the process will begin anew searching for the valid "Out" time.

If the heading in block 526 is different than the stored "Out" time heading sample, the step block 528 determines if the engines are running. If the engines are not running, then the process continues until either the engines are started or the aircraft returns to the gate. The "Off" test begins when the engines are running (block 530).

Figure 8:
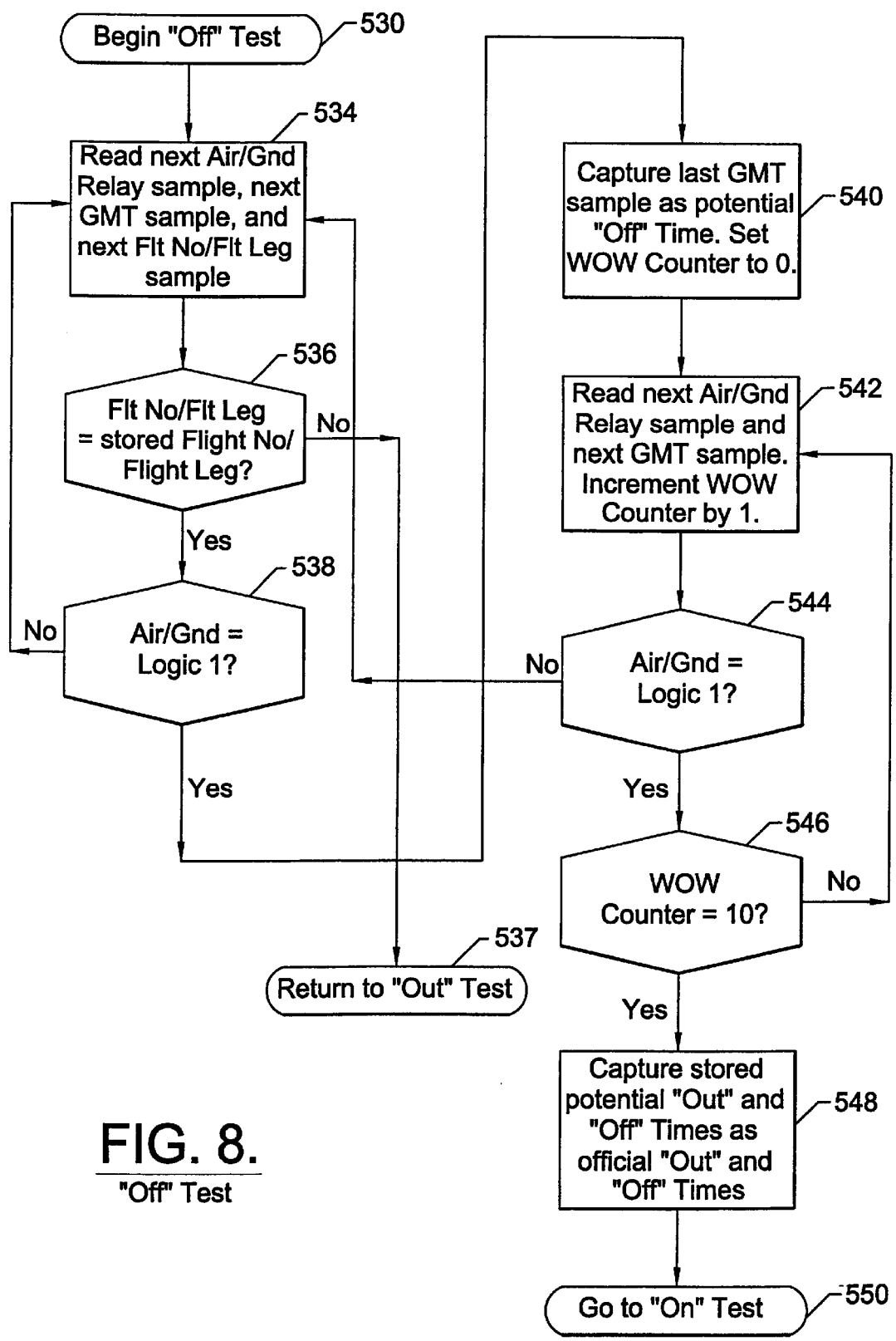
FIG. 8 is a flow chart illustrating the "off" test.

The flow chart for the "Off" Test is shown in FIG. 8. The "Off" Test is entered (block 530) upon completion of the "Out" Test. The next Air/Ground Relay, GMT, flight number, and flight leg samples are read in block 534). The new flight number and flight leg samples are then compared against those stored in memory to make sure they have not changed (block 536). This addresses the scenario where a flight is cancelled due to detection of an unsafe condition that is determined after push back. In this case, the aircraft would potentially return to a different gate if the one it departed from were occupied. Once the passengers deplane, the flight number and flight leg would change, either as a result of the aircraft being classified as being in maintenance mode, or the unsafe condition is rectified and the aircraft is returned to service for its next assigned flight number/leg. If this step of block 536 detects a change in flight number or flight leg, it returns to the start of the "Out" Test (block 537).

The system then looks for a change in the Air/Ground relay logic (block 538). The process continues, as long as the flight number and leg remain the same and the aircraft remains on the ground. Once the Air/Ground relay changes state, the last GMT sample is captured and classified as the potential "Off" Time (block 540). A Weight on Wheels (WOW) counter is also set to zero.

The next Air/Ground relay and GMT samples are read (block 542). If the Air/Ground relay changes state before the WOW counter increments to 10 seconds, the system returns to the start of the "Off" Test to search for a new "Off" time (block 544). The system checks to see if the WOW Counter has incremented to 10 (block 546), indicating the aircraft has been in the air for 10 consecutive seconds. The process repeats until the Air/Ground relay consistently indicates the aircraft has been in the air for 10 seconds. At this point, the captured potential "Out" and "Off" times are classified as the official "Out" and "Off" times (block 548). The "On" Test begins once the aircraft has been airborne for 10 consecutive seconds (block 550).

Figure 9:
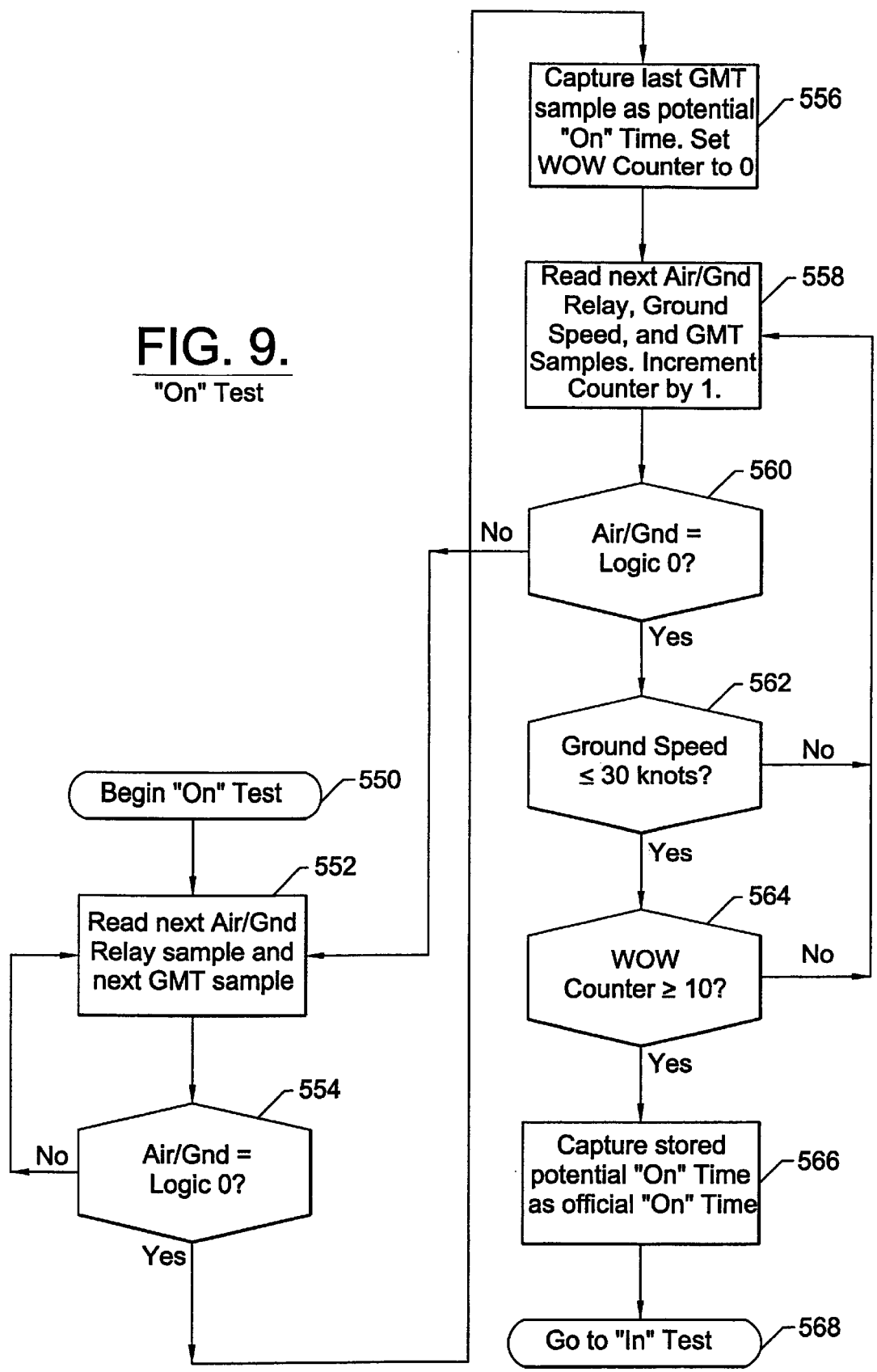
FIG. 9 is a flow chart illustrating the "on" test.

The "On" Test is shown in FIG. 9. The next Air/Ground Relay and GMT samples are read (block 552). The system then checks to see if the aircraft lands (block 554). As long as the aircraft remains airborne, the Air/Ground Relay and GMT parameters are continuously monitored. When the Air/Ground logic changes state, the last GMT sample is captured as a potential "On" time (block 556). The WOW counter is also set to zero.

The next Air/Ground relay, ground speed and GMT samples are read (block 558). If the Air/Ground relay changes state before the WOW counter increments to 10 seconds, the system returns to the start of the "On" Test to search for a new "On" time (block 560). The system then checks to see if the ground speed is less than or equal to 30 knots (block 564). The system then checks to see if the WOW Counter has incremented to 10, indicating the aircraft has been on the ground for 10 consecutive seconds (block 564). The process repeats until the Air/Ground relay consistently indicates that the aircraft has been on the ground for 10 seconds and that ground speed is less than or equal to 30 knots. At this point, the captured potential "On" time is classified as the official "On" time (block 566). The "In" Test begins once the aircraft has been on the ground for 10 consecutive seconds and the ground speed is less than 30 knots (block 568).

Figure 10:
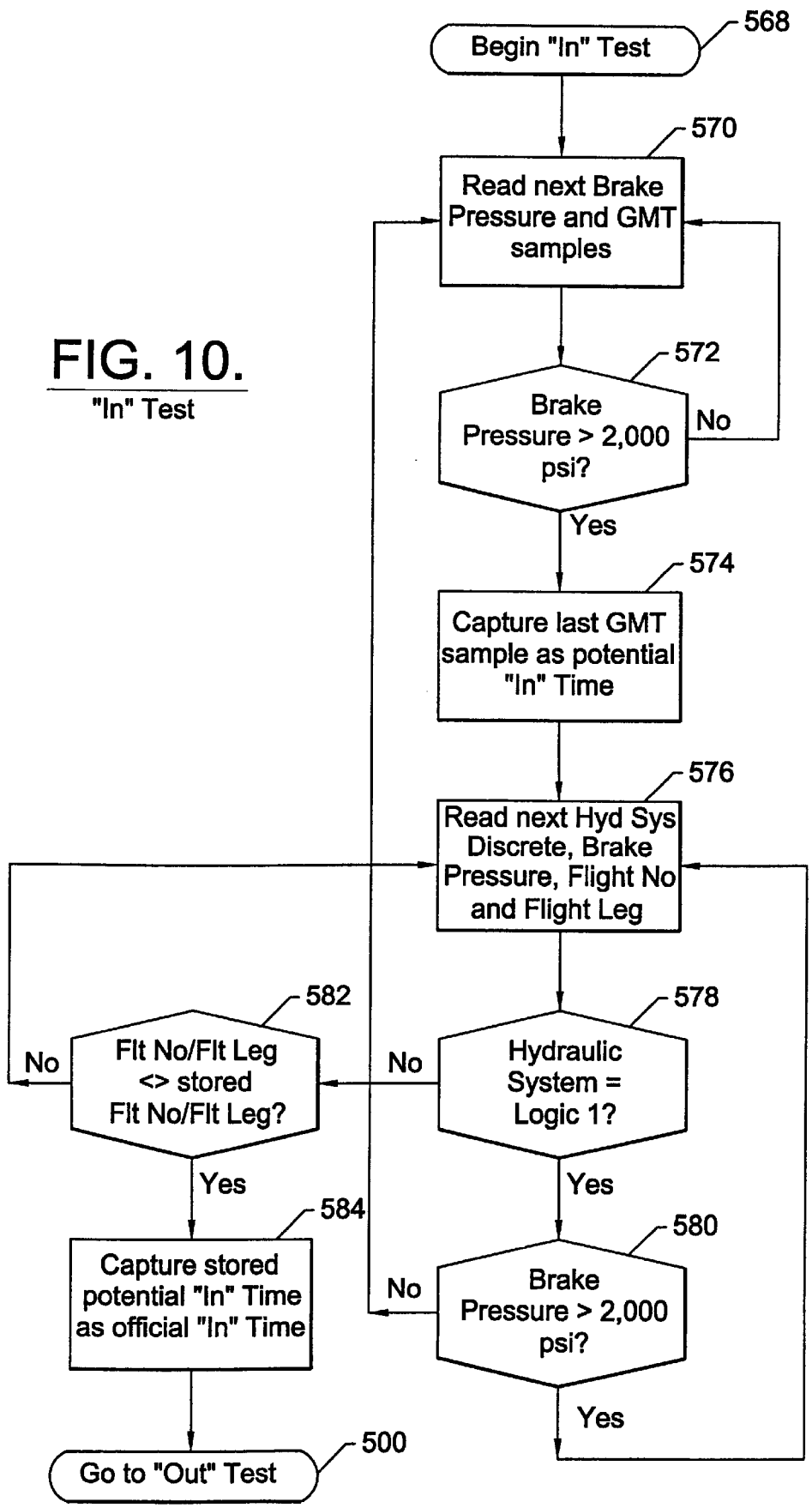
FIG. 10 is a flow chart illustrating the "in" test.

The "In" Test is shown in FIG. 10. The next brake pressure and GMT samples are read (block 570). The system checks to see if the parking brake is set (block 572). As long as the aircraft is taxiing, the brake pressure and GMT parameters are continuously monitored. When the parking brake is set, the last GMT sample is captured as a potential "In" time (block 574).

The next hydraulic system discrete, brake pressure, flight number, and flight leg samples are read (block 576). The system checks to see if the engines have been shut down (block 578). The system then checks to see that the parking brake is still set (block 580). If the parking brake is released before the engines are shut down, then the stored potential "In" time is invalid and the process returns to the beginning of the "In" test to search for a new "In" time. The parking brake is often set during a hold in the taxi in process.

If the engines are shut down while the parking brake is set, the flight number and flight leg are monitored (block 582) to determine if they have changed. As long as the flight number and flight leg do not change, the engines are continuously monitored (block 578). If the engines start and the parking brake is released, then the process returns to the beginning of the "In" Test to search for a new "In" time. Sometimes the engines are shut down during an extended hold while waiting for a gate to free up in order to conserve fuel.

When a flight number and flight leg change is detected (block 582), the captured potential "In" time is classified as the official "In" time (block 584). The "Out" Test begins once the engines are shut down and a flight number and flight leg change is detected.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system of providing a retrievable record of the "Out," "Off," "On," and "In" (OOOI) times of an aircraft comprising:
   a plurality of sensors located throughout the aircraft for sensing routine aircraft conditions and generating parametric data;
   a central processing unit positioned within the aircraft for receiving the parametric data and calculating the OOOI times of the aircraft;
   a data store positioned within the aircraft and connected to the central processing unit and operative to accumulate and store the data relating to the calculated OOOI times of the aircraft; and
   a wideband spread spectrum transceiver coupled to the data store and operative to download the data relating to the calculated OOOI times of the aircraft over a wideband spread spectrum communication signal.

2. A system according to claim 1, and further comprising a ground based wideband spread spectrum receiver that receives the wideband spread spectrum communication signal from the aircraft and demodulates the signal to obtain the data relating to the calculated OOOI times of the aircraft.

3. A system and method according to claim 2, wherein said ground based receiver comprises a transceiver.

4. A system according to claim 1, wherein said wideband spread spectrum transceiver is operative to download the data relating to the calculated OOOI times after the aircraft completes its flight and lands at an airport.

5. A system according to claim 1, wherein said plurality of sensors further comprise a sensor for measuring the hydraulic pressure.

6. A system according to claim 1, wherein said plurality of sensors further comprise a sensor for measuring brake pressure.

7. A system according to claim 1, wherein said plurality of sensors further comprise a sensor for measuring the heading of the aircraft.

8. A system according to claim 1, wherein said plurality of sensors further comprise a sensor for determining the weight on wheels.

9. A system according to claim 1, and further comprising a wireless router for routing the data relating to the OOOI times from the airport based wideband spread spectrum receiver via a first wideband spread spectrum communication signal to a ground based wideband spread spectrum transceiver functioning as a repeater to relay the data relating to the OOOI times of the aircraft via a second wideband spread spectrum communication signal.

10. A system according to claim 1, and further comprising a multiplexer operatively connected to the plurality of sensors for receiving the parametric data from the plurality of sensors and multiplexing the parametric data.

11. A system according to claim 10, wherein said central processing unit is operative for demultiplexing the parametric data.

12. A method of providing a retrievable record of the "Out," "Off," "On," and "In" (OOOI) times an aircraft comprising the steps of:

acquiring parametric data relating to the OOOI times of an aircraft during taxi, takeoff, flight and landing of the aircraft;

accumulating and storing within a data store of a ground data link unit the data relating to the OOOI times; and downloading the data relating to the OOOI times that has been accumulated and stored within the data store over a wideband spread spectrum communication signal.

13. A method according to claim 12, and further comprising the steps of downloading the data relating to the OOOI times to ground based spread spectrum transceiver and demodulating the received wideband spread spectrum signal to obtain the data relating to the OOOI times.

14. A method according to claim 13, and further comprising the steps of:

storing the demodulated data relating to the OOOI times within a ground based archival data store; and retrieving the data relating to the OOOI times via a ground based processor for further processing.

15. A method according to claim 12, and further comprising the step of acquiring data relating to the OOOI times by determining the next flight number and flight leg.

16. A method according to claim 12, and further comprising the step of acquiring data relating to the OOOI times by sensing the brake system pressure.

17. A method according to claim 12, and further comprising the step of acquiring data relating to the OOOI times by a sensing the hydraulic system pressure.

18. A method according to claim 12, and further comprising the step of acquiring data relating to the OOOI times by determining the heading of the aircraft.

19. A method according to claim 12, and further comprising the step of acquiring data relating to the OOOI times by determining the next departure station and arrival station.

20. A method according to claim 12, and further comprising the step of acquiring data relating to the OOOI times by determining the next flight number and flight leg.

21. A method according to claim 12, and further comprising the step of acquiring data relating to the OOOI times by determining the next air/ground relay sample.

22. A method according to claim 12, and further comprising the step of acquiring data relating to the OOOI times by sensing the weight on wheels.

23. A method according to claim 12, and further comprising the step of acquiring data relating to the OOOI times by measuring ground speed of the aircraft.

24. A method of providing "Out," "Off," "On," and "In" (OOOI) times of an aircraft comprising the steps of:

sampling parametric data that is routinely sampled and presented as a stream of data to a flight data recorder of an aircraft;

calculating within a central processing unit positioned within the aircraft the OOOI times of the aircraft from the parametric data;

storing data relating to the calculated OOOI times of the aircraft within a data store positioned within the aircraft; and downloading the data relating to the calculated OOOI times over a radio frequency communication signal to an airport based receiver.

25. A method according to claim 24, wherein said radio frequency communication signal comprises a wideband spread spectrum communication signal.

* * * * *